UNITED STATES PATENT OFFICE.

THEOBALD WENDLING, OF NEW YORK, N. Y., ASSIGNOR TO CARL BOMEISLER AND HENRY FISHER, OF NEW YORK, N. Y.

FILTERING SUBSTANCE AND PROCESS OF MAKING SAME.

SPECIFICATION forming part of Letters Patent No. 724,636, dated April 7, 1903.

Application filed June 27, 1902. Serial No. 113,540. (Specimens).

*To all whom it may concern:*

Be it known that I, THEOBALD WENDLING, a citizen of the United States, residing at the city of New York, borough of Manhattan, in the county and State of New York, have invented certain new and useful Improvements in Filtering Substances and Processes of Making Same, of which the following is a full, clear, and exact specification.

My invention relates to improvements in filtering substances and the process of making the same; and said invention has for its object more particularly to provide an efficient and inexpensive filtering substance, and, further, to provide a simple, expeditious, and economical method of producing the same.

These objects above set forth I am enabled to attain by means of my invention, hereinafter more fully described and then pointed out in the claims.

In carrying out my invention I take a quantity of asbestos fiber and mix therewith a quantity of calcium carbonate, such as marble-dust, and then add thereto hydrochloric acid or any other acid capable of combining with the calcium carbonate to yield a gas capable of disintegrating the fibers of the asbestos, the disintegration of the asbestos fiber being effected by the action of the particles of calcium carbonate and the hydrochloric acid in entering the interstices of said fiber and generating carbonic-acid gas therein, which by its force causes the fibers to be torn apart or disintegrated. This action is then permitted to continue until the effervescence ceases. Hereupon the asbestos is washed to free the same of acid and residuum and the excess of water then removed. After treating the asbestos fiber as above described I next add thereto a sufficient quantity of a silicate in suspension, preferably magnesium silicate, and thoroughly mix the same to form a thin paste. I then take a quantity of asbestos cloth and apply the paste above described thereto, preferably to one side thereof only, until the asbestos cloth is thoroughly impregnated and coated therewith. The asbestos cloth thus impregnated and coated is then subjected to a temperature of about 300° centigrade and baked for about one hour. Upon withdrawal from the oven the product, which is then stiff and resilient, is thereupon washed to free the same of any uncombined chemicals and after being so washed is found to have been rendered tough, porous, and pliable (the extent of its pliability, however, depending upon the thickness of the fabric treated and the quantity of mixture applied thereto) and to constitute a perfect filtering substance capable of excluding substantially all matter mechanically suspended in the liquid and a large proportion of any germs which the same may be found to contain.

Having thus described my invention, what I claim, and desire to secure by Letters Patent, is—

1. The process of making filtering substances which consists in taking asbestos fiber, disintegrating the fibers of said asbestos fiber, adding a silicate suspended in water thereto to form a paste, applying said paste to asbestos cloth, baking the same, and finally washing the product to free the same of any uncombined chemicals, substantially as specified.

2. The process of making filtering substances which consists in taking asbestos fiber, treating the same with a carbonate and an acid yielding an agent capable of disintegrating the fibers of said asbestos fiber, washing the asbestos fiber to free the same of the acid and residuum, adding a silicate in suspension thereto to form a paste, applying said paste to asbestos cloth, baking the same, and finally washing the product to free the same of any uncombined chemicals, substantially as specified.

3. The process of making filtering substances which consists in taking asbestos fiber, treating the same with calcium carbonate and hydrochloric acid, until the effervescence ceases, washing the asbestos fiber to free the same of the acid and residuum, adding magnesium silicate in suspension thereto to form a paste, applying said paste to asbestos cloth and impregnating and coating the latter therewith, then subjecting the same to a temperature of about 300° centigrade and baking the same for about one hour, and finally washing the product to free the same of any uncombined chemicals, substantially as specified.

4. A filtering substance consisting of asbestos cloth treated with a mixture composed of disintegrated asbestos fiber and a silicate, substantially as specified.

5. A filtering substance consisting of fabric treated, impregnated and coated with a mixture composed of asbestos fiber and a silicate, substantially as specified.

6. A filtering substance consisting of a silicious fabric treated, impregnated and coated with a mixture composed of asbestos fiber and a silicate, substantially as specified.

7. A filtering substance consisting of asbestos cloth treated with a mixture composed of disintegrated asbestos fiber and a silicate suspended in a suitable vehicle, substantially as specified.

8. A filtering substance consisting of asbestos cloth treated, impregnated and coated with a mixture composed of disintegrated asbestos fiber, and magnesium silicate; the product being a tough, pliable and porous substance, substantially as specified.

Signed at the city of New York, in the county and State of New York, this 25th day of June, 1902.

THEOBALD WENDLING.

Witnesses:
CARL BOMEISLER,
HENRY FISHER.